(12) United States Patent
Barmatov et al.

(10) Patent No.: US 10,787,745 B2
(45) Date of Patent: Sep. 29, 2020

(54) CORROSION INHIBITION

(71) Applicant: SCHLUMBERGER TECHNOLOGY CORPORATION, Sugar Land, TX (US)

(72) Inventors: Evgeny Borisovich Barmatov, Cambridge (GB); Jill F. Geddes, Cambridge (GB); Lynne Patricia Crawford, Cambridge (GB); Trevor Lloyd Hughes, Cambridge (GB); Michaela Nagl-Vogel, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 112 days.

(21) Appl. No.: 15/533,315

(22) PCT Filed: Oct. 19, 2015

(86) PCT No.: PCT/US2015/056144
§ 371 (c)(1),
(2) Date: Jun. 5, 2017

(87) PCT Pub. No.: WO2016/089487
PCT Pub. Date: Jun. 9, 2016

(65) Prior Publication Data
US 2017/0335467 A1 Nov. 23, 2017

(30) Foreign Application Priority Data

Dec. 5, 2014 (GB) .................................. 1421656.8

(51) Int. Cl.
| | |
|---|---|
| C23F 11/00 | (2006.01) |
| C23F 11/08 | (2006.01) |
| C23F 11/10 | (2006.01) |
| C23F 11/12 | (2006.01) |
| C23F 11/16 | (2006.01) |
| C23F 11/173 | (2006.01) |
| C23F 11/04 | (2006.01) |
| C09D 7/63 | (2018.01) |
| C09K 8/54 | (2006.01) |
| C23F 11/14 | (2006.01) |
| C09D 5/08 | (2006.01) |

(52) U.S. Cl.
CPC .............. *C23F 11/04* (2013.01); *C09D 5/086* (2013.01); *C09D 7/63* (2018.01); *C09K 8/54* (2013.01); *C23F 11/141* (2013.01); *C23F 11/149* (2013.01); *C23F 11/165* (2013.01); *C09K 2208/32* (2013.01)

(58) Field of Classification Search
CPC ....... C23F 11/04; C23F 11/141; C23F 11/149; C09D 7/63; C09K 8/54; C09K 2208/32
USPC ...................................................... 524/804
See application file for complete search history.

(56) References Cited

U.S. PATENT DOCUMENTS

| | | | |
|---|---|---|---|
| 2,935,474 A * | 5/1960 | Kirkpatrick ........... | C23F 11/145 507/240 |
| 3,081,304 A | 3/1963 | Rogier | |
| 3,335,090 A | 8/1967 | Davidowich | |
| 3,337,470 A | 8/1967 | Davidowich | |
| 3,816,322 A | 6/1974 | Griffin et al. | |
| 3,854,959 A | 12/1974 | Costain et al. | |
| 3,876,371 A | 4/1975 | Costain et al. | |
| 4,028,268 A | 6/1977 | Sullivan, 3rd et al. | |
| 4,120,654 A | 10/1978 | Quinlan et al. | |
| 4,387,041 A | 6/1983 | Hort et al. | |
| 4,698,168 A | 10/1987 | Briggs | |
| 4,734,259 A | 3/1988 | Frenier et al. | |
| 4,880,907 A | 11/1989 | Chiang | |
| 4,946,849 A | 8/1990 | Makler | |
| 5,096,618 A | 3/1992 | Frenier | |
| 5,120,471 A | 6/1992 | Jasinski et al. | |
| 5,158,693 A | 10/1992 | Ramanarayanan et al. | |
| 5,591,381 A | 1/1997 | Walker | |
| 5,697,443 A | 12/1997 | Brezinski et al. | |
| 5,756,004 A | 5/1998 | Brezinski | |
| 5,763,368 A | 6/1998 | Brezinski | |
| 5,976,416 A | 11/1999 | Brezinski | |
| 6,281,172 B1 | 8/2001 | Warren et al. | |
| 7,216,710 B2 | 5/2007 | Welton et al. | |
| 7,906,544 B2 | 3/2011 | Melander et al. | |

(Continued)

FOREIGN PATENT DOCUMENTS

| | | |
|---|---|---|
| CN | 101892042 B | 11/2010 |
| CN | 102049213 A | 5/2011 |

(Continued)

OTHER PUBLICATIONS

Finsgar, Matjaz et al., "Application of Corrosion Inhibitors for Steels in Acidic Media for the Oil and Gas Industry: A Review", Corrosion Science, vol. 86, May 9, 2014, pp. 17-41.
Foster, G.L. et al., "Acetylenic Corrosion Inhibitors", Industrial and Engineering Chemistry, vol. 51, Jul. 1, 1959, pp. 825-828.
Podobaev, N.I. et al., "A Review of Acetylene Compounds and Inhibitors of Acid Corrosion of Iron", Protection of Metals, vol. 40, Jan. 1, 2004, pp. 7-13.
Lowmunkhong, et al, "Tryptamine as a Corrosion Inhibitor of Mild Steel in Hydrochloric Acid Solution," Corrosion Science, vol. 52, (2010) pp. 30-36.

(Continued)

*Primary Examiner* — Kelechi C Egwim
(74) *Attorney, Agent, or Firm* — Cathy Hewitt

(57) ABSTRACT

A corrosion inhibiting composition which is a liquid carrier in which is dissolved or dispersed a corrosion inhibitor compound comprising at least one moiety (A) which is an aliphatic, aromatic or mixed aliphatic/aromatic structure containing one or more hetero atoms which are nitrogen, oxygen, phosphorus or sulphur, and also at least one moiety (B) which contains one or more polymerisable groups containing double or triple bonded carbon, with the moieties (A) and (B) directly or indirectly covalently connected together.

14 Claims, No Drawings

(56) References Cited

U.S. PATENT DOCUMENTS

| | | | |
|---|---|---|---|
| 8,288,410 | B2 | 10/2012 | Ablordeppey |
| 8,318,085 | B2 | 11/2012 | Cassidy et al. |
| 10,087,530 | B2 | 10/2018 | Hughes et al. |
| 2004/0235674 | A1 | 11/2004 | Youngson et al. |
| 2010/0261623 | A1 | 10/2010 | Cassidy et al. |
| 2013/0112106 | A1 | 5/2013 | Malwitz et al. |
| 2013/0310282 | A1 | 11/2013 | Kulkarni et al. |
| 2014/0027675 | A1 | 1/2014 | Matulewicz et al. |
| 2015/0152329 | A1 | 6/2015 | Seetharaman et al. |
| 2018/0135187 | A1 | 5/2018 | Crawford et al. |
| 2018/0312980 | A1 | 11/2018 | Crawford et al. |

FOREIGN PATENT DOCUMENTS

| | | | | |
|---|---|---|---|---|
| CN | 103014715 | B | 4/2013 | |
| CN | 103865506 | A | 6/2014 | |
| EP | 0080794 | A1 * | 6/1983 | ............ C23F 11/04 |
| EP | 0080794 | A1 | 6/1983 | |
| EP | 0187322 | A1 | 7/1986 | |
| EP | 0212752 | A1 | 3/1987 | |
| EP | 0243982 | A1 | 11/1987 | |
| EP | 0328319 | A1 | 8/1989 | |
| EP | 0623598 | A1 | 11/1994 | |
| EP | 0869258 | A1 | 10/1998 | |
| GB | 1434354 | A | 5/1976 | |
| GB | 2529723 | A | 3/2016 | |
| JP | 2000038689 | A | 2/2000 | |
| JP | 2007291079 | A | 11/2007 | |
| WO | 9602508 | A1 | 2/1996 | |
| WO | 0123374 | A1 | 4/2001 | |
| WO | 0242248 | A2 | 5/2002 | |
| WO | 03105849 | A1 | 12/2003 | |
| WO | 2004065351 | A1 | 8/2004 | |
| WO | 2006035954 | A1 | 4/2006 | |
| WO | 2006136262 | A1 | 12/2006 | |
| WO | 2008157234 | A2 | 12/2008 | |
| WO | 2010023638 | A1 | 3/2010 | |

OTHER PUBLICATIONS

Rehim, et al, "On the Corrosion Inhibition of Low Carbon Steel in Concentrated Sulphuric Acid Solutions. Part I: Chemical and Electrochemical (AC and DC) Studies," Corrosion Science, vol. 50 (2008) pp. 2258-2271.

Tu, et al, "Synthesis of N-Alkyl-4-(4-Hydroxybut-2-Ynyl) Pyridinium Bromides and Their Corrosion Inhibition Activities on X70 Steel in 5 M HCI," Corrosion Science, vol. 65 (2012) pp. 13-25.

Vasilevsky, et al, "Synthesis and Properties of Acetylenic Derivatives of Pyrazoles," Advances in Heterocyclic Chemistry, vol. 82, 99 pages.

Frenier et al, "A-Alkenylphenones—A New Class of Acid Corrosion Inhibitors," Corrosion Science, National Associate of Corrosion Engineers (1988) pp. 590-598.

Chiang, L.Y. et al., "Chemistry of Catalytic Dehydrogenative Oligomerization of Tetrahydroquinoline and Structural Characterization of Nonsubstituted Quinolone Oligomers", Journal of the American Chemical Society, 1991, 113(17), pp. 6574-6584.

Chiang, L.Y. et al., "Novel Quaternary Salts of Quinolone Oligomer as Metal Surface Protective Materials against Acid Corrosion", Chemistry of Materials, 1992, 4(2), pp. 245-247.

Frenier, W.W. et al., "Mechanism of Iron Oxide Dissolution—A Review of Recent Literature", paper 121, presented at the 39th Corrosion Forum, NACE International, Houston, Texas, U.S.A., 1984, pp. 663-668.

Frenier, W.W., "Acidizing Fluids Used to Stimulate High Temperature Wells Can be Inhibited Using Organic Chemicals", Society of Petroleum Engineers (SPE) paper 18468, presented at the SPE International Symposium on Oilfield Chemistry, Houston, Texas, U.S.A., 1989, pp. 111-123.

Gamboa-Vujicic, G. et al., "Toxicity of the mitochondrial poison dequalinium chloride in a murine model system", Journal of Pharmaceutical Sciences, 1993, 82(3), pp. 231-235.

Hartwell, J. et al., "Some Quaternary Ammonium Salts of Heterocyclic Bases. III. Bis-Quaternary Ammonium Salts", Journal of the American Chemical Society, 1950, 72(5), pp. 2040-2044.

Hegazy, M.A., "A novel Schiff base-based cationic Gemini surfactant: Synthesis and effect on corrosion inhibition of carbon steel in hydrochloric acid solution", Corrosion Science, 2009, 51, pp. 2610-2618.

Kanbara, T. et al., "Preparation of New Redox-Active Quaternized Poly(quinolinium) and Poly(isoquinolinium) Salts Showing Viologen-like Redox Behaviour", Macromolecules, 1993, 26, pp. 1975-1979.

Komloova, M. et al., "Preparation, in vitro screening and molecular modelling of symmetrical bis-quinolinium cholinesterase inhibitors-implications for early Myasthenia gravis treatment", Bioorganic and Medicinal Chemistry Letters, 2011, 21, pp. 2505-2509.

Meakins, R.J., "Inhibition of the Corrosion of Steel by Long-Chain n-Alkylisoquinolinium Compounds", British Corrosion Journal, 1973, 8, pp. 230-234.

Mishra, A. et al., "New push-pull type dendritic stilbazolium dyes: synthesis, photophysical and electrochemical investigation", Dyes and Pigments, 2004, 63(2), pp. 191-202.

Oguzie, E. et al., "Inhibitive effect of methyl green dye on the corrosion of low carbon steel in acidic media", Pigment & Resin Technology, 2009, 38(6), pp 359-365.

Schmitt, G. et al., "Effect of Corrosion Inhibitors on the Hydrogen Uptake of Steel in Hydrochloric Acid", Proceedings of the 5th European Symposium Corrosion Inhibitors, Ferrara, Italy, 1980, pp. 337-353.

Schmitt, G. et al., "Investigations on structural and electronic effects in acid inhibitors by AC impedance", Materials and Corrosion, 1985, 36(6), pp. 273-278.

Stern, M. "A Method for Determining Corrosion Rates from Linear Polarization Data", Corrosion, 1958, 14(9), pp. 440-444.

Stern, M. et al., "Electrochemical Polarization: I. Theoretical Analysis of the Shape of Polarization Curves", Journal of the Electrochemical Society 1957, 104, pp. 56-63.

Wang, X., et al., "A cationic gemini surfactant as effective inhibitor for mild steel in HCI solutions", Corrosion Science, 2010, 52, pp. 1268-1276.

Yurchenko, R.I. et al., "Comparative Effect of N-Decyl and N-Phenacylmethylpyridinium Bromides in Acid Corrosion of Steel", Russian Journal of Applied Chemistry, 2011, 84(11), pp. 2008-2010.

Yurchenko, R.I. et al., "Inhibiting Action of 1-Phenacylmethyl-2-R-Quinolinium Bromides at Steel Acid Corrosion", Russian Journal of Applied Chemistry, 2011, 84(11), pp. 2011-2012.

Ferreira, E. S. et al., "Evaluation of the inhibitor effect of L-ascorbic acid on the corrosion of mild steel", Materials Chemistry and Physics, 2004, 83(1), pp. 129-134.

Al-Taq, A. A. et al., "Inhibition Performance of a New Series of Mono-/Diamine-Based Corrosion Inhibitors for HCL Solutions", SPE 114807-PA, SPE Journal, 2009, 14(4), pp. 627-633.

Coppola, G. M. et al., Perhydroquinolylbenzamides as Novel Inhibitors of 11.beta.-Hydroxysteroid Dehydrogenase Type 1, Journal of Medicinal Chemistry, American Chemistry Society, 48 (21), 17 pages.

Schleimer, M. et al., "Enantiomer separation by high-performance liquid chromatography on polysiloxane-based chiral stationary phases", Journal of Chromatography A, 1994, 679(1), pp. 23-34.

Pirkle, W. H. et al., "An Improved Chiral Stationary Phase for the Facile Separation of Enantiomers", Journal of Chromatography A, 1988, 441(20), pp. 311-322.

Pirkle, W. H. et al., "Chromatographic Separation of the Enantiomers of N-Acylated Heterocyclic Amines", Journal of Organic Chemistry, American Chemical Society, Us, 1984, pp. 2504-2506.

Frenier, W. W., "Corrosion, Passivation, and Inhibition", in Technology for Chemical Cleaning of Industrial Equipment, NACE International, Houston, Texas, 2001, pp. 51-91.

* cited by examiner

CORROSION INHIBITION

BACKGROUND

There are numerous circumstances where it is desired to protect metal, notably steel or an alloy steel, from corrosion. These include the protection of steel used in a subterranean borehole to access a hydrocarbon reservoir and, more particularly but not by way of limitation the protection of steel exposed to a corrosive aqueous acidic liquid, such as when steel tubing is used to convey a flow of acidic aqueous liquid.

One industry which has a need for protection of steel against corrosion is oil and gas exploration and production. Steel tubulars used in a borehole may be exposed to corrosive conditions and so may steel pipelines used to carry produced oil and gas. In the oil and gas industry exposure to acidic solution may result from deliberate use of acid in an oilfield operation.

The technique of matrix acidizing, in which the producing formation is treated with acid to stimulate production, involves deliberate exposure of borehole steel to acid. This operation may be performed with coiled tubing, which is run into a borehole and then used to convey acid down the borehole to the formation. When the matrix acidizing operation comes to an end, the steel casing in the borehole and the exterior of the coiled tubing can be exposed to so-called unspent acid flowing back with formation fluids that flow back towards the surface.

Steel may be protected against corrosion by contacting the steel with an organic corrosion inhibitor. These organic inhibitors adsorb on the metal surface. Adsorbed inhibitor(s) may influence the rate of corrosion by one or more of several mechanisms: (i) by forming a physical barrier film which restricts the diffusion of species to/from the metal surface, (ii) by blocking anodic and/or cathodic reaction sites directly, (iii) by interacting with corrosion reaction intermediates adsorbed on the surface and (iv) by influencing the electrical double layer that forms at the metal/solution interface.

Adsorption may comprise physi-sorption which is the result of electrostatic attractive forces between inhibiting organic ions or dipoles and the electrically charged surface of the metal. The surface charge of the metal is due to the electric field at the outer Helmholtz plane of the electrical double layer existing at the metal/solution interface.

Another possibility is that adsorption is by chemi-sorption, which takes place more slowly than electrostatic adsorption and with a higher activation energy. Chemisorption involves electron transfer from electron-rich sites within the structure of the inhibitor molecule(s) to vacant low energy orbitals in the metal. Typically, such electron-rich sites within an inhibitor molecule are heteroatoms with lone pair(s) of electrons or are multiple bonds and aromatic rings so that covalent bonds have electrons in $\pi$-orbitals. Because activation energy is required, to bring about chemisorption, the extent of chemi-sorption and therefore the efficacy of corrosion inhibition may increase with temperature.

Chemi-sorbed acetylenic compounds can react to form polymeric inhibitor films. Such reaction/polymerisation is surface-catalysed.

Corrosion inhibitors are frequently marketed as a mixture containing materials which inhibit corrosion together with other materials which enhance inhibition, even though these other materials do not function as corrosion inhibitors (or are less efficacious) if used alone. In some cases these mixtures are proprietary and their exact composition is not made public.

A mixture which contains a chemi-sorbing corrosion inhibitor may also include non-ionic or cationic surfactants to assist in solubilising other components in the mixture and/or to assist in deposition on the steel, quaternary nitrogen compounds, amines (which will protonate to quaternary nitrogen under acidic conditions) and organic solvent(s). Some oilfield corrosion inhibitor products are mixtures which make use of a synergistic combination of an amine and an acetylenic alcohol.

The corrosion inhibiting effect of an inhibitor or corrosion inhibiting mixture can be tested in various ways. One direct method of testing is to use a test piece, which is a sample of the steel to be protected, customarily referred to as a "coupon". This coupon is exposed for a measured length of time to an acidic solution containing a known concentration of corrosion inhibitor. The loss in weight of the coupon is measured and expressed as weight loss per unit surface area. The coupon may also be examined for localised pitting and the extent of pitting may be expressed as a numerical value: the so-called pitting index.

When steel is going to be exposed to a flow of a corrosive acidic composition, it is normal practice to test coupons of the steel with various concentrations of corrosion inhibitor in samples of the corrosive composition. A concentration of inhibitor which produces an acceptably low weight loss and pitting index is identified and this concentration of inhibitor is then maintained constantly in the flow of the corrosive composition to which the steel is exposed.

So-called stainless steels are alloy steels containing chromium and nickel as the main alloying metals. Alloy steels may have a single phase, either ferrite or austenite, or may have two phases mingled together.

The relative resistance of a stainless steel to chloride pitting and crevice corrosion can be related to alloy composition by the empirical formula known as the pitting resistance equivalent number (PREN). The most commonly used PREN expression is:

$$PREN = wt\% \ Cr + 3.3(wt\% \ Mo + 0.5(wt\% \ W)) + x \cdot wt\% \ N$$

where x is given as either 16 or 30.

Duplex stainless steels are composed of a mixture of austenite and ferrite phases, most typically with each phase in the range 25-75 vol %. They may have either a ferrite matrix or an austenitic matrix. As shown by the following table, the specified compositions for a range of duplex stainless steels include molybdenum and sometimes include other alloying metals such as tungsten, manganese and copper.

| DUPLEX STAINLESS STEEL GRADES AND FEATURES | | | | | | | | | |
|---|---|---|---|---|---|---|---|---|---|
| Metal | | Composition (wt %) | | | | | | Ni/Cr | |
| Name | UNS no. | C | N | Cr | Ni | Mo | Cu, W, other | ratio | PREN |
| "Lean" | S32101 | 0.03 | 0.22 | 21.5 | 1.5 | 0.3 | | 0.070 | 26 |
| 2304 | S32304 | 0.02 | 0.10 | 23.0 | 4.8 | 0.3 | | 0.209 | 26 |
| 2404 | S82441 | 0.02 | 0.27 | 24.0 | 3.6 | 1.6 | | 0.15 | 34 |
| 2205 | S32205 | 0.03 max | 0.08-0.20 | 21.0-23.0 | 4.5-6.5 | 2.5-3.5 | Si 1.0 max Mn 2.0 max | 0.25 | 34 |
| 2507 | S32750 | 0.02 | 0.27 | 25.0 | 7.0 | 4.0 | | 0.28 | 43 |
| SM22Cr | | ≤0.03 | 0.08-0.20 | 21.0-23.0 | 4.5-6.5 | 2.5-3.5 | — | 0.25 | 34 |
| SM25Cr | | ≤0.03 | 0.10-0.30 | 24.0-26.0 | 5.5-7.5 | 2.5-3.5 | W 0.1-0.5 | 0.26 | 39 |
| SM25Cr W | | ≤0.03 | 0.24-0.32 | 24.0-26.0 | 6-8 | 2.5-3.5 | W 2.1-2.5 | 0.28 | 43 |
| DP3 | S31260 | 0.03 | 0.1-0.3 | 24.0-26.0 | 5.5-7.5 | 2.5-3.5 | Cu 0.2-0.8 W 0.1-0.5 | 0.26 | 39 |
| 255 | S32550 | 0.04 | 0.1-0.25 | 24.0-27.0 | 4.5-6.5 | 2.9-3.9 | Cu 1.5-2.5 | 0.216 | 40 |
| 100 | S32760 | 0.03 | 0.2-0.3 | 24.0-26.0 | 6.0-8.0 | 3.0-4.0 | Cu 0.5-1.0 W 0.5-1.0 | 0.28 | 41 |
| 52N+ | S32520 | 0.03 | 0.2-0.35 | 24.0-26.0 | 5.5-8.0 | 3.0-5.0 | Cu 0.5-3.0 | 0.27 | 43 |
| 2507 | S32507 | 0.03 | 0.24-0.32 | 24.0-26.0 | 6.0-8.0 | 3.0-5.0 | Cu 0.50 | 0.28 | 43 |

Typically, the duplex alloy 2205, contains 45-55 vol % austentite in a ferrite matrix, i.e. the ferrite is the continuous phase. The main alloying elements, chromium, molybdenum, nickel, manganese and nitrogen are not equally distributed in the two phases. Austentite is enriched in nickel, manganese and nitrogen whilst ferrite is enriched in chromium and molybdenum. The nickel-rich austenite phase is cathodic relative to the anodic ferrite matrix. Steel pipework and steel casing in a borehole are sometimes made of duplex stainless steel and are examples of duplex stainless steel which may be exposed to acidic solutions during well invention operations such as matrix acidizing treatments.

Other alloy steels have a single phase, which may be ferritic or autenitic. Examples are given in the following table:

| SINGLE PHASE STAINLESS STEEL GRADES AND FEATURES | | | | | | | | | |
|---|---|---|---|---|---|---|---|---|---|
| Metal Name | UNS no. | Composition (wt %) | | | | | | Ni/Cr ratio | PREN |
| | | C | N | Cr | Ni | Mo | Cu, W, other | | |
| AUSTENITIC | | | | | | | | | |
| 254 SMO | S31254 | 0.02 | 0.18-0.22 | 19.5-20.5 | 17.5-18.5 | 6.0-6.5 | Cu 0.50-1.0 | 0.9 | 44 |
| Nirosta 456SS | S24565 | 0.03 | 0.4-0.6 | 23.0-25.0 | 16.0-18.0 | 3.5-5.0 | Mn 3.5-6.5 | 0.708 | 46 |
| 654-SMO | S32654 | 0.02 | 0.45-0.55 | 24.0-26.0 | 21.0-23.0 | 7.0-8.0 | Cu 0.3-0.6 Mn 2.0-4.0 | 0.88 | 58 |
| FERRITIC | | | | | | | | | |
| E-brite 26-1 | S44627 | 0.01 | 0.015 | 25.0-27.0 | 0.50 | 0.75-1.50 | Cu 0.20 Nb 0.05-0.2 | 0.019 | 30 |
| Monit | S44635 | 0.025 | 0.035 | 24.5-26.0 | 3.5-4.5 | 3.5-4.5 | — | 0.158 | 39 |
| Seacure | S44660 | 0.03 | 0.040 | 25.0-28.0 | 1.0-3.5 | 3.0-4.0 | — | 0.085 | 39 |
| AL 29-4C | S44735 | 0.03 | 0.045 | 28.0-30.0 | 1.00 | 3.6-4.2 | — | 0.034 | 43 |

SUMMARY

This summary is provided to introduce a selection of concepts that are further described below. This summary is not intended to be used as an aid in limiting the scope of the subject matter claimed.

Applicants have observed that cationic materials, which chemi-sorb to a metal surface can give good initial corrosion protection, but can also de-sorb, and so may not remain on the metal surface after an initial exposure to the cationic material. By contrast, compounds which are able to polymerise on the metal surface form a persistent films so that corrosion protection is long lasting. As such, embodiments of the present disclosure provide further development of corrosion inhibitor compounds able to polymerise on the metal surface.

A first aspect of the present disclosure is a compound containing at least one moiety (A) comprising at least one hetero atom which is nitrogen, oxygen, phosphorus or sulphur, and also at least one moiety (B) which contains one or more polymerisable groups containing at least one double or triple bonded carbon atom, with the moieties (A) and (B) directly or indirectly covalently connected together.

Some embodiments of such a compound may be represented by a general formula A(m)-Y(p)-B(n) wherein Y denotes a covalent bond or a connecting moiety, and m, n and p each independently denote a value in a range from 1 to 10. A linking group Y may be an aliphatic, aromatic or mixed aliphatic and aromatic moiety.

In further aspects, the present disclosure provides each of:
An aqueous solution, which may be an aqueous acidic solution, having dissolved or suspended therein a corrosion inhibiting amount of a compound according to the first aspect of this disclosure;

A corrosion inhibiting composition, which may be a liquid concentrate intended to be used as a corrosion inhibiting additive in an aqueous solution, containing a compound according to the first aspect of this disclosure and a carrier material which may be a carrier fluid;

A method of inhibiting corrosion of a metal, which may be steel, exposed to aqueous solution, comprising including a compound according to the first aspect of this disclosure in the aqueous solution.

Use of a compound according to the first aspect of this disclosure as an inhibitor of corrosion during exposure to aqueous solution. In some embodiments the method is a method of inhibiting corrosion of steel surfaces in a system exposed to an aqueous liquid, wherein the surfaces comprise at least two steels which differ in composition, i.e. differ qualitatively and/or quantitatively in the elements additional to iron which are present in the steel.

In some embodiments the method is a method of inhibiting corrosion of duplex steel surfaces in a system exposed to an aqueous liquid. The steel surfaces may then comprise at least two steels which differ in composition where at least one steel surface is a duplex steel.

The metal(s) which is exposed to aqueous solution may be located in a subterranean borehole. Aqueous solution containing a compound according to the first aspect of this invention may be acidic. It may possibly be a solution with pH below zero, as is the case with a solution used for matrix acidizing. Thus the corrosion inhibiting compound may be utilized in a matrix acidizing composition and procedure.

A sub-structure constituting a moiety (A) may comprise an aliphatic, aromatic or mixed aliphatic/aromatic structure and then a heteroatom may:

(i) reside within heterocyclic aromatic or aliphatic ring structure(s), or
(ii) (be attached to aromatic or aliphatic ring structure(s) (said rings being optionally heterocyclic) and/or
(iii) be attached to one or more aliphatic carbon atoms, for instance as in aliphatic amines and quaternary ammonium compounds.

Each of these possibilities has the hetero atom attached to one or more carbon atoms by covalent bonds. Within a moiety (A) there may be more than one hetero atom in which case some hetero atoms may be in or attached to aromatic rings while others may be in aliphatic groups. The number of carbon atoms in a moiety (A) may possibly be at least three but not more than 25, possibly not more than 20. The ratio of carbon atoms to hetero atoms in a moiety (A) may possibly lie in a range from 2:1 or 3:1 up to 7:1 or 10:1.

At least one heteroatom within a moiety (A) may be nitrogen. It is possible that a moiety (A) may contain a plurality of hetero atoms where at least some, perhaps a majority, of the hetero atoms are nitrogen whilst the remainder of the hetero atoms are oxygen, phosphorus or sulphur. It is also possible that a moiety (A) may contain a plurality of hetero atoms which are all nitrogen.

A moiety (A) may enhance solubility in aqueous corrosive fluid and may promote or enhance adsorption and interaction on a range of different metal and alloy surfaces. A moiety (A) may therefore include functional groups which promote solubility and enhance physi- and/or chemi-sorption. When the structure of a moiety (A) incorporates multiple fused aromatic and/or aromatic/aliphatic rings, additional substituents may be incorporated to increase solubility in the aqueous corrosive fluid and/or to promote adsorption on metal surfaces.

A moiety (B) contains a group intended to polymerise with other polymerisable groups after adsorption onto a metal surface. It contains at least one aliphatic carbon atom with a double or triple bond. Examples are a carbon-carbon triple bond as in an acetylenic group, a carbon-nitrogen triple bond as in a cyano group and conjugated double bonds in a structure with an olefinic double bond conjugated to a keto group, as in an alpha-olefinic aldehyde or alpha-olefinic ketone structure. The number of carbon atoms in a moiety (B) may be at least three and possibly at least four or five. The number of carbon atoms in a moiety (B) may possibly be no more than 25, possibly no more than 18, 12 or even 6, Preferably moiety Y denotes a linking group containing at least three carbon atoms. This provides flexibility in the structure of the molecule, which allows the moiety B to polymerise more easily thus enhancing corrosion inhibition.

If moiety Y is a connecting group, it may contain a saturated carbon chain of at least three carbon atoms, providing some flexibility in the connection between moieties (A) and (B). A connecting group Y may be linear but it is also possible that a linking Y-group may be a branched hydrocarbon chain, e.g. —(CH$_2$)$_4$—CH(C$_2$H$_5$)—, and/or the chain may be partially unsaturated, e.g. —(CH$_2$)$_3$—CH=CH—(CH$_2$)$_2$—. A partially unsaturated chain may possibly incorporate at least two carbon-carbon single bonds. In addition, optionally, a linking carbon chain may incorporate an aromatic ring or rings.

In a further development, a corrosion inhibiting compound in accordance with this disclosure is used in a mixture with a second compound which comprises a moiety (B) (i.e. contains a polymerisable group) but does not contain a moiety (A). We have observed that the inclusion of the second molecule in a mixture can enhance the corrosion protection. Without limitation to theory, it is believed that although the second molecule may deposit poorly on the surface and give little corrosion resistance when used alone, it does copolymerise with the deposited compound in accordance with this disclosure and gives a more effective film on the metal surface.

The second compound may comprise one or more polymerisable groups containing double or triple bonded carbon. Optionally, the second compound comprises one or more polymerisable groups containing one of the structures

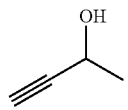

or —C≡N or

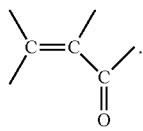

Preferably, the second compound has a molecular weight which is smaller than that of the first compound.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

As indicated in the summary above, the present disclosure is concerned with multifunctional compounds and their use as corrosion inhibitors in a corrosive solution, in particular in a corrosive acidic aqueous solution. Surfaces to be protected from corrosion will ordinarily be metallic and the metal may be an alloy. For instance surfaces to be protected may be steel and the steel may be single phase or duplex alloy steel.

It has been common practice to use a plurality of inhibitor compounds in a corrosion inhibiting formulation. However, we have recognised that the efficacy of a mixture is dependent on the proportions in which its constituents deposit on the metal surfaces to be protected. There can be significant heterogeneity in deposition if the metal has more than one phase and the protective inhibitor film may form at different rates on the different exposed phases of the metal microstructure. In some cases, the result is that a particular inhibitor formulation provides adequate protection on certain metals but the same formulation provides only a very limited (non-optimum) protection on other metals. This can be a major disadvantage when carrying out an operation which requires that a corrosive fluid contacts several different metals. Using a multifunctional compound, as disclosed herein, controls the proportions which are deposited in a way which is not possible when using a mixture of compounds.

As an illustration, it can be envisaged that a mixture might contain both a compound $R_1$-A and a compound $R_2$-B, wherein A and B may be moieties as defined in the summary above. If such a mixture is used to inhibit corrosion of a metal surface, it is possible that the extent of adsorption will be affected by (i) overall preferential adsorption of one of the molecules relative to the other, (ii) phase-specific adsorption of one or both of the molecules on different microstructural phases of the metal and/or (iii) coadsorption of $R_1$-A and $R_2$-B at an overall molar ratio which is different to the ratio provided in the mixture and which is non-optimum in terms of inhibition performance. For instance, a polymerisable group B might display strong preferential absorption on austenitic steel with poor absorption on another steel or alloy steel or vice versa, leading to poor overall inhibition of corrosion. Such segregated adsorption and co-adsorption behaviour will depend on the physico-chemical properties of the metal surface and the various microstructural phases exposed on that surface. Therefore, the degree and exact nature of this behaviour will be different on different metal surfaces with the possible consequence that there is inadequate corrosion protection for some of the metals which are exposed to the corrosive solution.

Even if a corrosion inhibitor mixture could be optimised for one metal and a given corrosion solution, the difficulties described above could still arise when trying to inhibit corrosion in a system where a plurality of metals (e.g. different alloys) are all exposed to the same corrosive solution.

By contrast multi-functional inhibitor molecules in which moieties (A) and (B) are parts of a single molecule provide a way to deliver desired functional groups to the surface of a broader range of metal surfaces and provide a way to control directly the molar ratio of functional groups in the adsorbed inhibitor film.

Applicants have observed that this can give enhanced overall corrosion protection. Multi-functional inhibitor molecules can be used to provide improved corrosion protection when applied on a broader range of metals as compared to the use of the same concentration of functional groups presented to the metal surfaces as a mixture of separate molecules.

As mentioned in the summary above the compounds disclosed herein contain moieties (A) and (B) which are directly or indirectly covalently connected. A general formula may be written as A(m)-Y(p)-B(n) wherein Y denotes a covalent bond or a connecting moiety, and m, n and p each independently denote a value in a range from 1 to 10. It will be appreciated that if A, Y and B all contain carbon atoms which are connected covalently, there may be more than one possibility for the choice of boundaries between moieties (A) and (B) and a connecting moiety Y between them.

A moiety (A) which has an organic (ie carbon-based) structure may be aromatic, aliphatic or mixed aromatic and aliphatic. It incorporates at least one hetero atom.

A moiety (A) may enhance solubility in aqueous solution because the presence of the hetero atom or atoms gives polarity within the molecule. The presence of the hetero atom or atoms may also assist physi-sorption or chemi-sorption onto a metallic surface.

A moiety (A) may have a hetero atom within an aromatic ring or may have a hetero atom directly attached to an aromatic ring so that the hetero atom can participate in the delocalised bonding of the aromatic ring. It is also possible that a moiety (A) may have a hetero atom in an aliphatic group. It will be appreciated that each of these possibilities has the hetero atom or atoms attached to the organic structure of the (A) moiety through one or more covalent bonds.

Within a moiety (A) there may be more than one hetero atom, in which case at least one hetero atom may be within or attached to an aromatic ring while at least one further hetero atom may be in an aliphatic group.

Within a moiety A, the number of carbon atoms maybe at least twice the number of hetero atoms but possibly not more than 10 times the number of hetero atoms. If a moiety (A) contains more than one aliphatic or aromatic ring, these may be separate rings connected together or may be in a fused ring system. In either case the ratio of rings to hetero atoms may lie in a range from 2:1 to 1:2, possibly from 2:1 to 1:1.

Some embodiments of moiety (A) have a fused ring system with at least one hetero atom in an aromatic ring and at least one further hetero atom in an aliphatic substituent group on an aliphatic ring.

In a number of embodiments a moiety (A) contains at least one hetero atom which is nitrogen. Such nitrogen atom(s) may be permanently cationically charged (e.g. as in N-alkyl substituted pyridinium structures and alkyl quaternary ammonium structures) or may be protonatable under acid conditions (e.g. as in amine-substituted aromatic ring structures and alkyl amines). Cationically charged nitrogen atom(s) both enhance solubility in the corrosive fluid and promote adsorption on a metal surface.

Some illustrations of compounds with nitrogen containing moieties (A) are given below. In these illustrative examples the moieties (A) are linked by covalent connections or connecting groups Y to moieties (B). These are shown simply as B and Y but not further specified.

1. Nitrogen within heterocyclic aromatic or liphatic ring structures—example classes:
   a. N-(Y-B)$_1$-pyridinium halides
   b. N-(Y-B)$_1$-quinolinium halides
   c. N-(Y-B)$_1$-acridinium halides
   d. N-(Y-B)$_1$-phenanthridinium halides
   e. N-(Y-B)$_1$-benzoacridinium halides
   f. N-(Y-B)$_1$-imidazolinium halides
   g. N-(Y-B)$_1$-carbazolinium halides When these structures incorporate multiple fused aromatic and/or aromatic/aliphatic rings, additional substituents (e.g. protonatable amine and/or hydroxyl groups) may be incorporated to enhance solubility in the aqueous corrosive fluid. Examples of such substituted versions are given below:

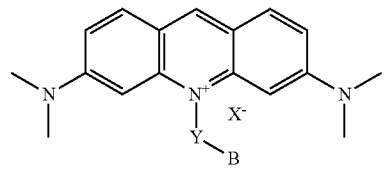

(B-Y-derivative of acridine orange base; the two tertiary amine groups become protonated under acid conditions leading to enhanced solubility in the corrosive fluid and enhanced adsorption)

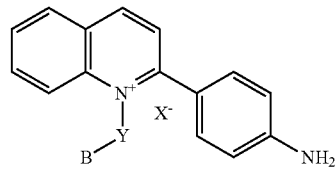

(B-Y-derivative of a substituted quinoline structure; the primary amine group becomes protonated under acid conditions leading to enhanced solubility in the corrosive fluid and enhanced adsorption)

If nitrogen is quaternised, the anion which is present may be a halide shown as X$^-$, which may be Cl$^-$, Br$^-$ or I$^-$. Iodide may be chosen because it is known that the presence of iodide anions enhances the adsorption of compounds containing cationic N atom(s) and/or N atoms which protonate under acid conditions.

2. Nitrogen external to aromatic or aliphatic ring structure(S) (said rings being optionally heterocyclic)—examples:
   a. B-Y-derivatives of aniline (or substituted anilines)
   b. B-Y-derivatives of phenylene diamines (o-, m-, p-)
   c. B-Y-derivatives of mono-, di-, tri- or tetra-amino naphthalenes (or their derivatives)
   d. B-Y-derivatives of aminated tetrahydronaphthalenes (or their derivatives)
   e. B-Y-derivatives of mono-, di-, tri- or tetra-amino anthraquinones (or their derivatives)
   f. B-Y-derivatives of pararosaniline (and its derivatives)
   g. B-Y-derivatives of aminated pyridine, quinoline, acridine, phenanthridine, imidazoline, carbazolines (and their derivatives)

Some example structures are given below:

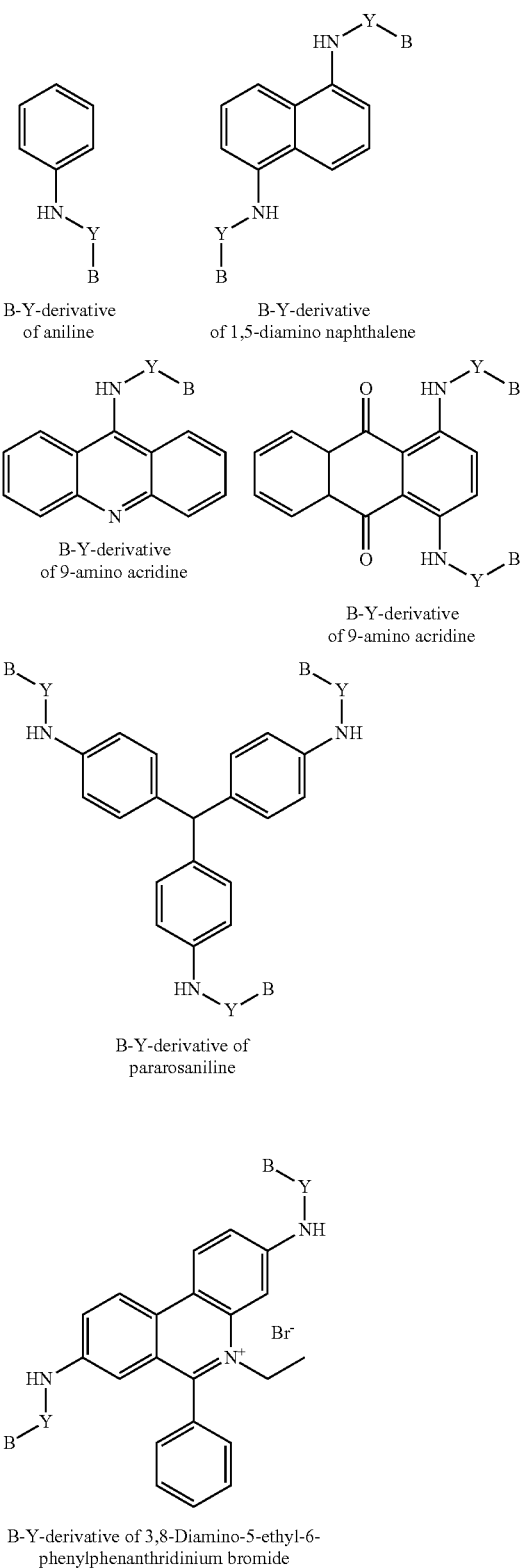

3. Nitrogen attached to hydrogen and/or aliphatic carbons as in aliphatic amines and quaternary ammonium structures—examples:

a. B-Y-derivatives of amines, e.g.

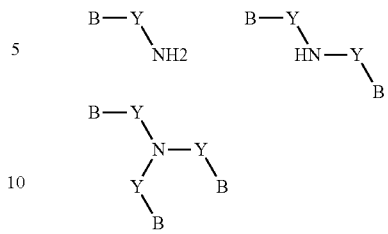

b. Corresponding B-Y-derivatives of diamines, triamine, tetramines (and derivatives)
c. B-Y-functionalized quaternary ammonium structures described by the general formulae:
  i. $(R_1, R_2, R_3)N^+\text{-}(Y\text{-}B)_1 X^-$,
  ii. $(R_1, R_2)N^+\text{-}(Y\text{-}B)_2 X^-$ and
  iii. $(R_1)N^+\text{-}(Y\text{-}B)_3 X^-$
where $R_1$, $R_2$ and $R_3$ are linear or branched saturated or partially unsaturated alkyl chains with or without additional substituents such as hydroxyl groups. $R_1$, $R_2$ and $R_3$ can be the same or different. For instance, in the examples shown below, $R_1$ is a linear dodecyl chain and exemplary $R_2$ and $R_3$ are methyl, ethyl or hydroxyethyl groups.

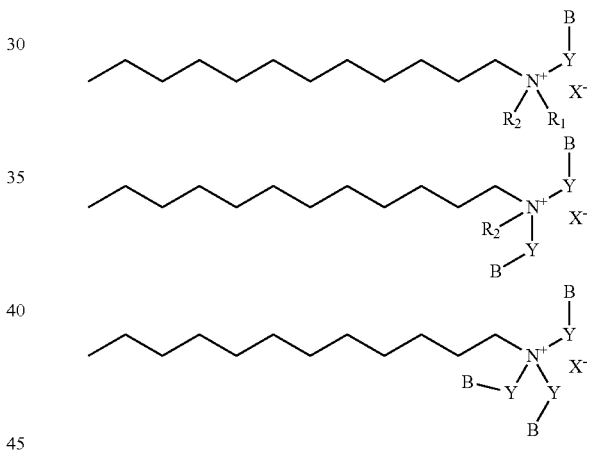

It will be appreciated that the compounds above conform to a general formula A(m)-Y(p)-B(n) wherein moiety (A) is provided by the alkylamino portion of the molecule, m is 1 and n increases from 1 to 2 to 3.

As mentioned in the summary above, a moiety (B) contains a polymerisable functional group. Such groups are capable of polymerisation with other such groups after deposition on the metal surface and this enables the molecules to combine together as a protective film. This polymerisable group may contain triple bonded carbon as in an acetylenic —C≡C— group or in a —C≡N cyano group. A polymerisable group may be one or more of
  (i) an acetylenic group (two carbons joined by a triple bond) and a hydroxyl group attached to two adjacent carbon atoms,

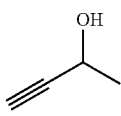

(ii) a cyano group (carbon and nitrogen joined by a triple bond), —C≡N (iii) an alkenyl ketone or alkenyl aldehyde containing an olefinic double bond conjugated with the double bond of a keto group, thus providing a structure:

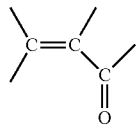

In some embodiments moiety B contains a polymerisable group which is a —C(OH)—C≡CH, i.e. a terminal alkyne with a hydroxyl group linked to the α-carbon atom, also referred to as a propargyl group.

When moiety (B) is —C(OH)—C≡CH, the general formula of the resultant multi-functional corrosion inhibitor structures may be $(A)_m$-$(Y$—$C(OH)$—$C≡CH)_n$. Some representative examples of this structure are given below:

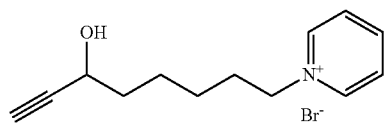

1-(7-Octyn-6-ol)pyridinium bromide (I)

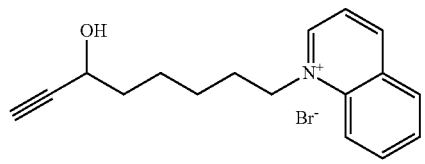

1-(7-Octyn-6-ol)quinolinium bromide (II)

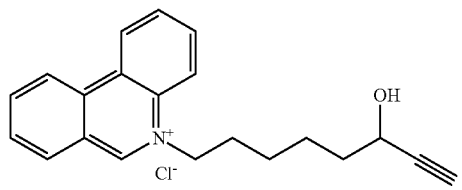

N-(7-Octyn-6-ol)phenanthridinium chloride (III)

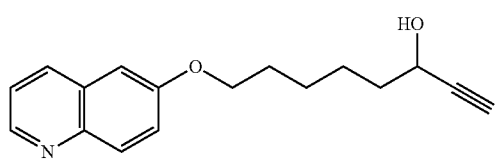

8-(quinolin-6-yloxy)oct-1-yn-3-ol (IV)

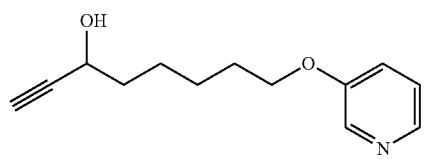

8-(pyridin-2-yloxy)oct-1-yn-3-ol (V)

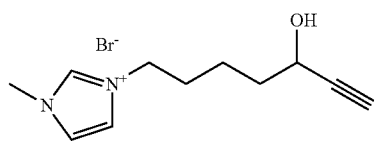

3-(5-hydroxyhept-6-ynyl)-1-methyl-1H-imidazol-3-ium bromide (VI)

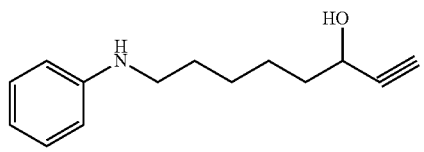

8-(Phenylamino)oct-1-yn-3-ol (VII)

The compounds above conform to the general structure $(A)_m$-$(Y$—$C(OH)$—$C≡CH)_n$ as follows In structure I, A=$C_5H_5N$, Y=$(CH_2)_5$, m=1, n=1
In structure II, A=$C_9H_7N$, Y=$(CH_2)_5$, m=1, n=1
In structure III, A=$C_{13}H_9N$, Y=$(CH_2)_5$, m=1, n=1
In structure IV, A=$C_9H_6N$, Y=—O—$(CH_2)_5$, m=1, n=1
In structure V, A=$C_5H_4N$, Y=—O—$(CH_2)_5$, m=1, n=1
In structure VI, A=$C_4H_6N_2$, Y=$(CH_2)_4$, m=1, n=1
In structure VII, A=$C_6H_5NH$, Y=$(CH_2)_5$, m=1, n=1

A compound may contain more than one moiety (B) and hence more than one polymerisable functional group. The more than one polymerisable functional groups may be identical to each other, or they may be different.

Examples of compounds with two propargyl groups are:

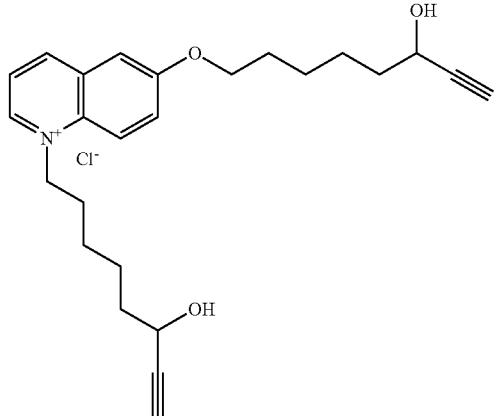

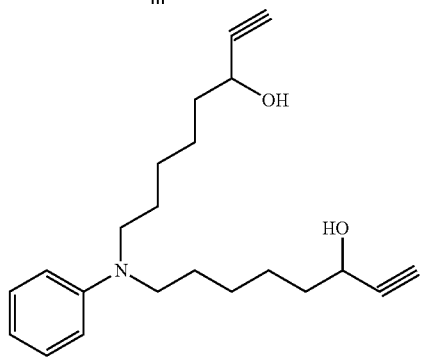

8,8'-(phenylazanediyl)di-oct-1-yn-3-ol (VIII)
conforming to general formula $(A)_m$-$(Y$—$C(OH)$—$C≡CH)_n$
with: A=$C_6H_5N$, Y=$(CH_2)_5$, m=1, n=2

A broad range of aromatic amines can be functionalized with B-Y where sub-structure B is —C(OH)—C≡CH. This broad range of aromatic amines includes 1,5-diamino-naphthalene, 9-amino-acridine, 1,4-diamino-anthraquinone, pararosaniline, and 3,8-diamino-5-ethyl-6-phenylphenanthridinium chloride. Thus, some other examples of functionalized aromatic amines where sub-structure B is —C(OH)—C≡CH are given below:

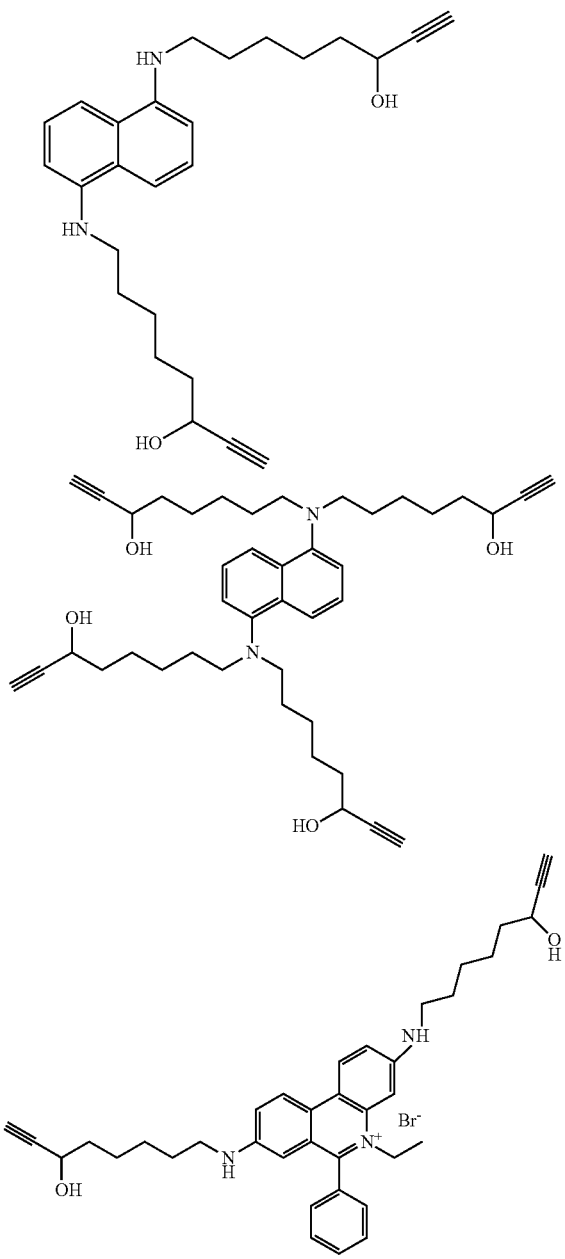

Several naturally occurring N-containing aromatic organic compounds are also candidates for B-Y-functionalization. One of these is tryptamine which has the structural formula:

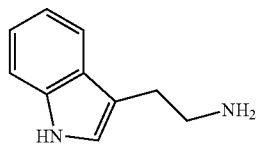 [SMILES: NCCc1c[nH]c2ccccc12]

which incorporates two nitrogen atoms, one external and one internal with respect to the aromatic hydrocarbon ring structure. Two examples of B-Y-derivatives of tryptamine (wherein B is —C(OH)—C≡CH) are :

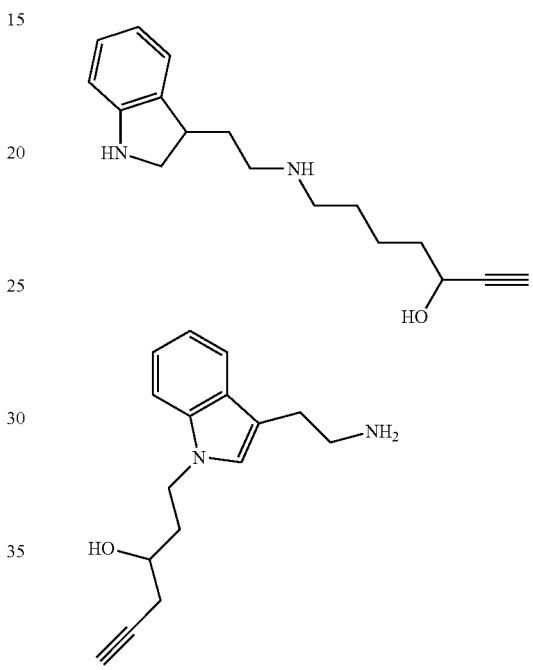

Similarly, other naturally occurring heterocyclic aromatic organic compounds such as purines and pyrimidines are good candidates for B-Y-functionalization. The purine structure consists of a pyrimidine ring fused to an imidazole ring. The purine family includes purine, adenine, guanine, hypoxanthine, xanthine, theobromine, caffeine, uric acid and isoguanine. These structures are shown below:

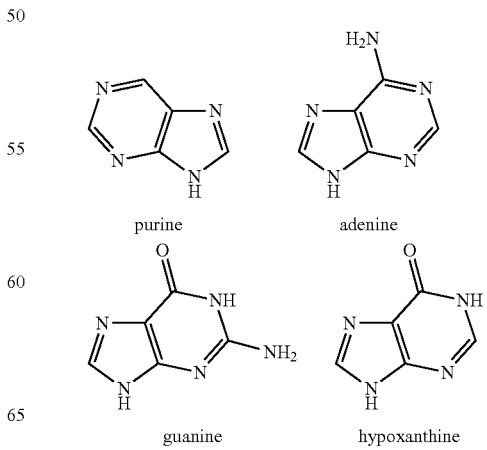

purine     adenine guanine     hypoxanthine

-continued

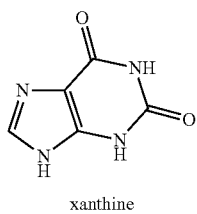
xanthine

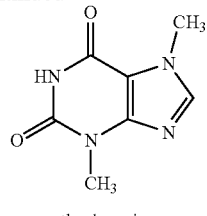
theobromine

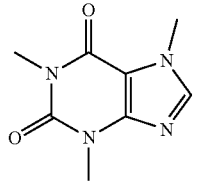
caffeine

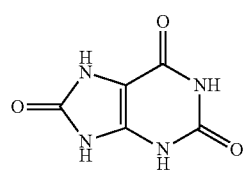
uric acid

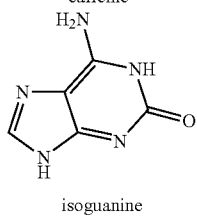
isoguanine

Some examples of compounds in which moiety (A) contains quaternary aliphatic nitrogen and moiety B contains —C(OH)—C≡CH are shown below. These conform to one of the general formulae (R1, R2, R3)N+–(Y-B)1X—, (R1, R2)N+–(Y-B)2X- and (R1)N+–(Y-B)3X—) as will be pointed out:

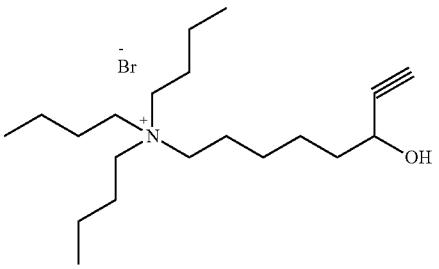

(IX)

Tri(n-butyl)(7-octyn-6-ol)ammonium bromide

General formula: (R1, R2, R3)N+–(Y-B)1X—
where: R1=R2=R3= n-butyl, Y=(CH2)5, B=—C(OH)—C≡CH, X=Cl—

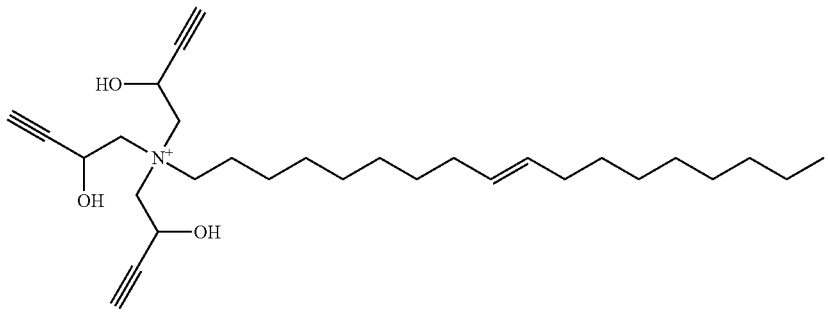

Tri(but-1-yn-3-ol)oleylammonium chloride

General formula: (R1)N+–(Y-B)3X
where R1=oleyl, Y=(CH2), B=—C(OH)—C≡CH, X=Cl—

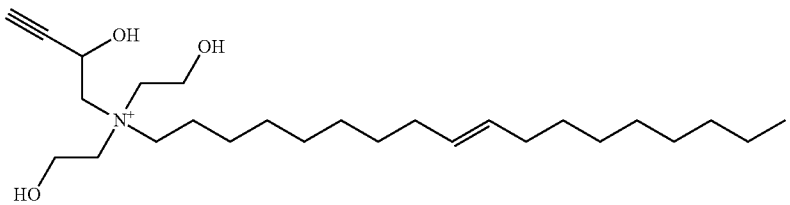

Mono(but-1-yn-3-ol)di(hydroxyethyl)oleylammonium chloride

General formula: (R1, R2, R3)N+-(Y-B)1X— where: R1=oleyl, R2=R3=hydroxyethyl, Y=(CH2)5, B=—C(OH)—C≡CH, X=Cl—

Tri(but-1-yn-3-ol)oleylammonium chloride and mono(but-1-yn-3-ol)di(hydroxyethyl) oleylammonium chloride each incorporate a hydrophobic oleyl group.

Two examples of B-Y-derivatives of aliphatic amines wherein B is —C(OH)—C≡CH are given below. These structures protonate under acid conditions leading to enhanced solubility in the corrosive fluid and enhanced adsorption on metal and alloy surfaces.

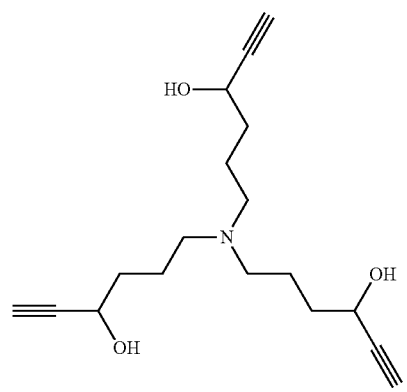

Tri(but-1-yn-3-ol)amine

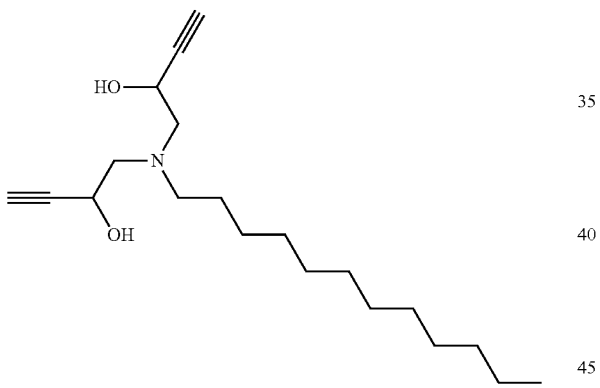

Di(but-1-yn-3-ol)dodecylamine

Examples of inhibitor compound in which moiety B contains a terminal alkyne functional group are:

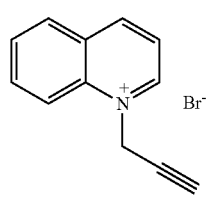
(X)

N-propynyl quinolinium bromide

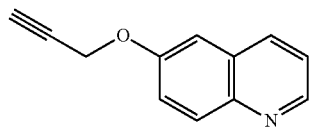
(XI)

3-(quinolin-6-yloxy)prop-1-yne

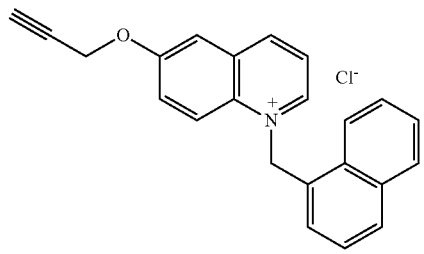
(XII)

3-(N-naphthylmethylquinolin-6-yloxy)prop-1-yne

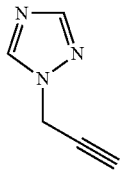
(XIII)

N-(3-prop-1-ynyl)triazine

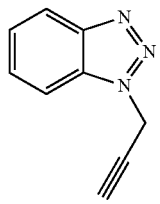
(XIV)

N-(3-prop-1-ynyl)benzotriazine

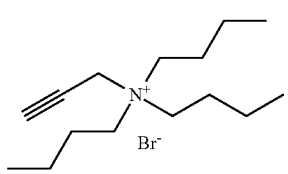
(XV)

Tri(n-butyl)(3-prop-1-ynyl)ammonium bromide

General formula: $(R_1, R_2, R_3)N^+$—$(Y-B)_1X^-$ where $R_1=R_2=R_3$=n-butyl, Y=—$CH_2$—, B=—C≡CH, X=$Br^-$ The above compounds (XI to XVI) incorporate two different Y-groups, viz. —$CH_2$— in structures XI, XIV, XV and XVI and —O—$CH_2$— in structures XII and XIII Related compounds could have a Y group which is a linear or branched hydrocarbon chain with 2-10 carbon atoms although longer chains are possible.

As mentioned earlier a polymerisable group in moiety B may be an a-alkenyl ketone group. A compound containing such a group may conform to a general formula

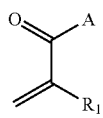
wherein the ketone function is directly linked to an aromatic ring in moiety (A) and the R₁ group is typically —CH₂OH or —CH₂OCH₃. Some examples of such compounds are
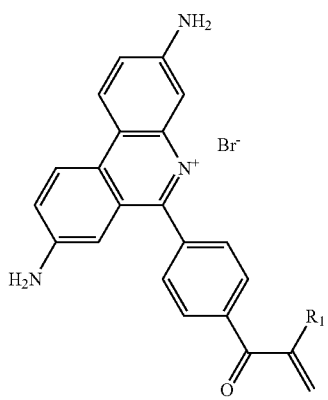
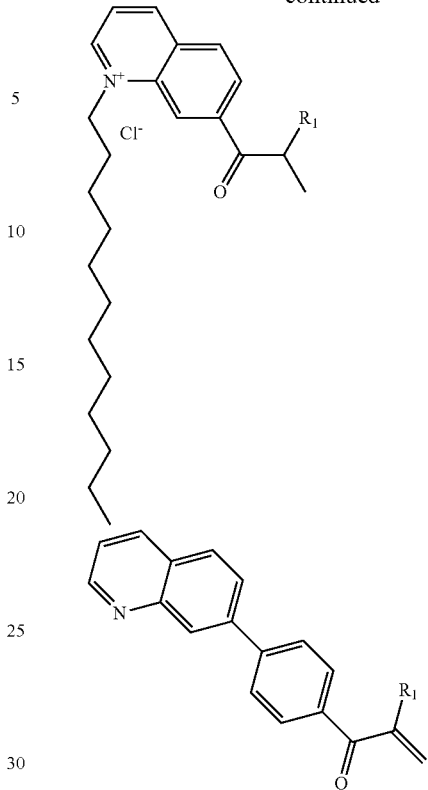
Instances of multi-functional inhibitor molecules which incorporate heteroatoms other than nitrogen within moiety (A) are shown below:
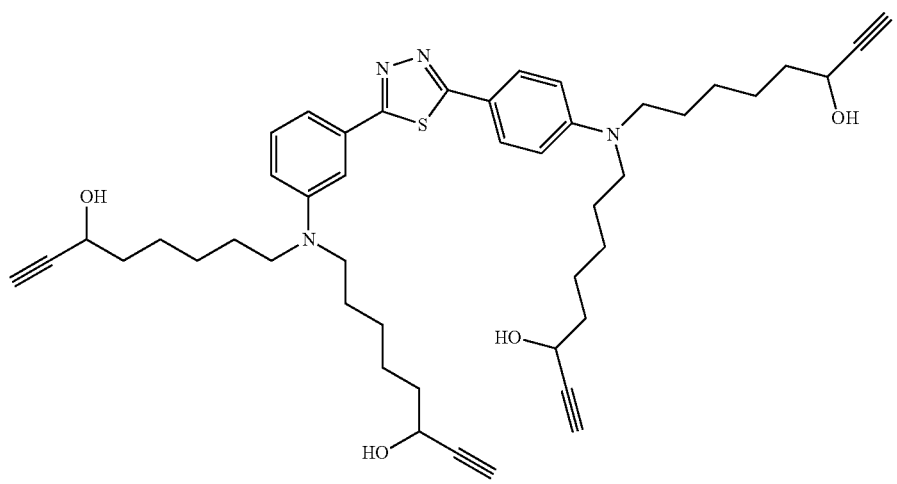
Alkynol-functionalised Thiadiazole

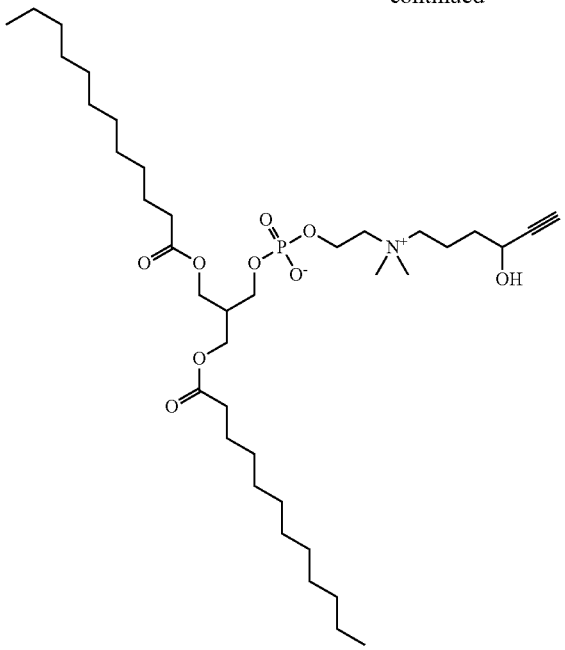

Alkynol-functionalised Phosphatidyl compound

The metal which is protected from corrosion by compound according to this disclosure may be steel or an alloy steel. An alloy steel may contain nickel, chromium, molybdenum and possibly other alloying metals.

In some embodiments, a compound according to this disclosure is included in an inhibitor composition which is used to protect a system in which there are a plurality of metals which come into contact with corrosive aqueous acidic liquid. The metals may be steel or steel alloys and they may be located within a subterranean borehole.

Examples of Synthesis of Multi-functional Inhibitor Compounds

8-Bromo-1-octyn-3-ol (precursor to structures wherein Y=(CH$_2$)$_5$ and B is the polymerisable group —C(OH)—C≡CH)

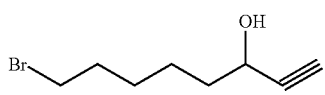

Ethyl 6-bromohexanoate (7.42g, 33mmol) was dissolved in toluene (100 ml) and cooled to −70° C. and 1M diisobutylaluminium hydride (1M in toluene (30ml)) added over 15 min and the reaction maintained at −75° C.±5° C. for 1.5 hr. Ethynyl magnesium bromide (0.5M in THF) (100 ml) was added over 20 min, the cooling bath removed and the mixture stirred for 3.5 hr. The mixture was quenched with NH$_4$Cl (aq) (150 ml) and de-ionised water (150 ml) at 0° C. and filtered through celite®. The aqueous phase was extracted with diethyl ether. The combined organic phases were extracted with de-ionised water and brine, dried over sodium sulfate and the solvent removed. The product was purified by column chromatography eluting with 15-20% diethyl ether in hexane to give 8-bromo-1-octyn-3-ol, 4 g (58% yield).

1-(6-Hydroxyoct-7-ynyl)pyridinium bromide (I)

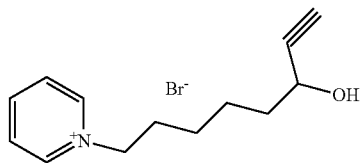

Pyridine (355 μl, 4.39 mmol) and 8-bromo-1-octyn-3-ol (1.8g, 1.5 mmol) in acetonitrile (5 ml) were heated at 50° C. for 20 hr. The cooled solution was partitioned between diethyl ether and water, the aqueous phase was removed, extracted with dichloromethane and freeze dried to give 1-(6-hydroxyoct-7-ynyl)pyridinium bromide, 1.17g (72%).

1-(6-Hydroxyoct-7-ynyl)quinolinium bromide (II)

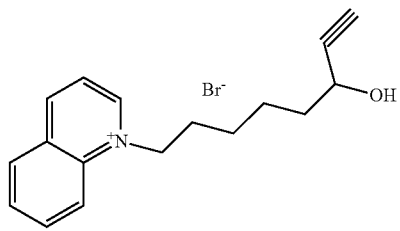 [SMILES: C#CC(O)CCCCC[n+]1cccc2ccccc21 ; [Br-]]

Quinoline (904 mg, 7 mmol) and 8-bromo-1-octyn-3-ol (1.79 g, 8.7 mmol) were heated in acetonitrile (3 ml) at 80° C. for 72 hr. The cooled solution was partitioned between diethyl ether and water, the aqueous phase was removed, extracted with diethyl ether (3×25 ml) and freeze dried to give 1-(6-hydroxyoct-7-ynyl)quinolinium bromide, 2.1 g (89%).

5-(6-Hydroxoct-7-ynyl)phenanthridinium bromide (III)

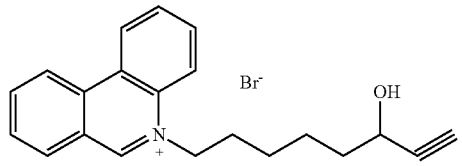

Phenanthridine (1.76 g, 9.82 mmol) and 8-bromo-1-octyn-3-ol (2.02 g, 9.8 mmol) were added to acetonitrile (40 ml) and heated at reflux for 48 hr, then stirred at ambient temperature for 72 hr. The solvent was evaporated and the residue partitioned between water and diethyl ether. The aqueous phase was removed, extracted with diethyl ether and freeze dried to give 5-(6-hydroxoct-7-ynyl)phenanthridinium bromide, 1.09 g (30%).

8-(Quinolin-6-yloxy)oct-1-yn-4-ol (IV)

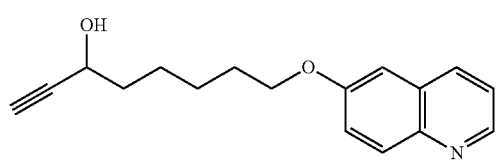 [SMILES: C#CC(O)CCCCCOc1ccc2ncccc2c1]

6-Hydroxnaphthalene (823 mg, 5.67 mmol), 8-bromo-1-octyn-3-ol (1.16 g, 5.65 mmol) and anhydrous potassium carbonate (4 g,) were added to acetone (30 ml) and heated at reflux for 16 hr; during which time the solvent was allowed to evaporate. The reaction was cooled, dichloromethane was added, the resulting solid was filtered off and washed with dichloromethane. The filtrate was concentrated and the residue was purified by column chromatography eluting with 30-50% ethyl acetate/hexane to give 8-(pyridin-3-yloxy)oct-1-yl-3-ol, 1.41 g (92% yield).

8-(Pyridin-3-yloxy)Oct-1-yl-3-ol (V)

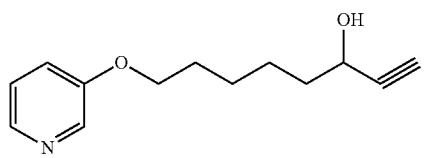 [SMILES: C#CC(O)CCCCCOc1cccnc1]

3-Hydroxypyridine (539 mg, 5.67 mmol), 8-bromo-1-octyn-3-ol (1.16 g, 5.65 mmol) and anhydrous potassium carbonate (4 g,) were added to acetone (30 ml) and heated at reflux for 24 hr. The reaction was cooled, the resulting solid filtered off and washed with acetone. The filtrate was concentrated, and the residue was purified by column chromatography eluting with 30-100% ethyl acetate/hexane to give 8-(pyridin-3-yloxy)oct-1-yl-3-ol , 527 mg,(42% yield).

3-(5-Hydroxyhept-6-ynyl)-methyl-1H-imidazol-3-ium Bromide (VI)

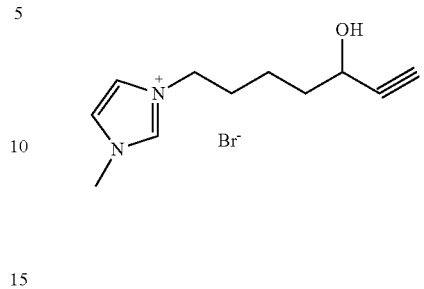

1-Methyimidazole (82 mg, 1 mmol) and 7-bromo-1-heptyn-3-ol (286 mg, 1.5 mmol) in acetonitrile (0.5 ml) were heated at 50° C. for 18 hr. The cooled solution was partitioned between diethyl ether and water, the aqueous phase was removed and extracted with dichloromethane and freeze dried to give 3-(5-hydroxyhept-6-ynyl)-methyl-1H-imidazol-3-ium bromide, 289 mg (>100% yield).

8-(Phenylamino)Oct-1-yn-3-ol (VII) and 8,8'-(phenylazanediyl)dioct-1-yn-3-ol (VIII)

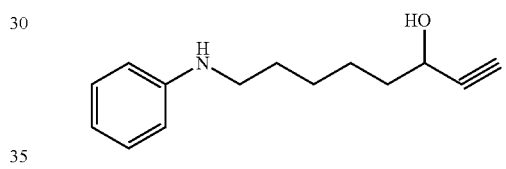

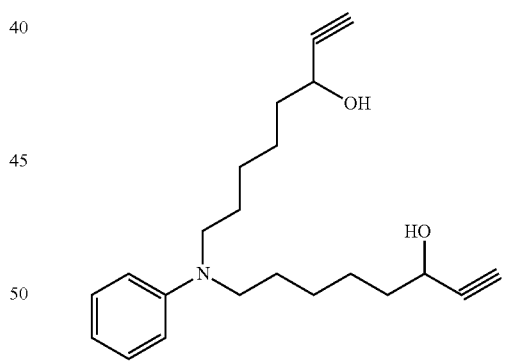

Aniline (100 µl), 8-bromo-1-octyn-3-ol (700 mg, 3.41 mmol), potassium iodide (35 mg) and potassium carbonate (920 mg) were added to acetone (5 ml) and heated at reflux for 72 hr. The resulting solid was filtered off, the filtrate concentrated and the residue applied to a silica chromatography column and eluted with ethyl acetate/hexane to give 8-(phenylamino)oct-1-yn-3-ol (101 mg) and 8,8'-(phenylazanediyl)dioct-1-yn-3-ol (93 mg).

N,N,N-Tributyl-6-hydroxyoct-7-yn-1-aminium bromide (IX)

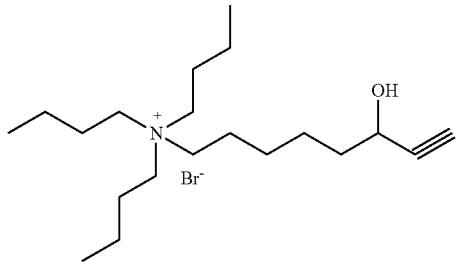

Tributylamine (930 mg 5.2 mmol) and 8-bromo-1-octyn-3-ol (520 mg, 2.53 mmol) were added to acetonitrile (1 ml) and heated at reflux for 24 hr. The reaction was cooled, diethyl ether added to give an oily precipitate. The solvent was decanted; diethyl ether was added to give a solid. The solid was filtered off and washed with diethyl ether and to give N,N,N-tributyl-6-hydroxyoct-7-yn-1-aminium bromide, 520 mg (52% yield).

EXPERIMENTAL EXAMPLES

Experiments were carried out with coupons of the following steels:
HS80, a low carbon steel used to fabricate coiled tubing.
13Cr80, an alloy steel containing chromium without nickel, used to fabricate borehole casing; and
22Cr125 also designated 2205, a duplex alloy steel which is an iron-chromium-nickel-molybdenum alloy, also used to fabricate casing.

Example 1

Experiments were carried out to observe instantaneous corrosion rates on 22Cr125 steel.

Corrosion test coupons with surface area of 25-30 cm$^2$ were glass bead blasted to ensure a clean and homogeneous surface, measured to determine their exact surface area, weighed and then exposed to 4 molar hydrochloric acid solution in a well stirred corrosion cell containing 200 mL acid solution per test coupon. The temperature was held at 78° C. The acid solution contained a corrosion inhibiting material or mixture of materials.

During a six hour test period, small sub-samples were taken from the acid solution and analysed for content of iron and chromium. Analysis was done using inductively coupled plasma mass spectrometry. The progressively increasing concentrations of iron and chromium in solution were added together so that the rate of weight loss as a function of exposure time could be calculated.

In one experiment, the corrosion inhibiting material in the acid solution was 0.3 wt % N-naphthylmethylquinolinium chloride ["NMQCl"]. Initially the rate of corrosion was low, at 0.0016 lb/ft$^2$/hour (7.8 gm/m$^2$/hour) but the rate of corrosion progressively increased, reaching 0.027 lb/ft$^2$/hour (132 gm/m$^2$/hour) after six hours. This suggests that as corrosion proceeds, the NMQCl de-sorbs from the metal surface.

In a second experiment, the corrosion inhibiting mixture was 0.3 wt % NMQCl accompanied by 0.1 wt % cinnamonitrile and 0.5 wt % of polyoxyethylene tridecyl alcohol, which is a nonionic surfactant. The corrosion rate remained below 0.0016 lb/ft$^2$/hour (7.8 gm/m$^2$/hour) throughout the six hour period. This was attributed to formation of a protective film through polymerisation of the cinnamonitrile after adsorption to the metal surface.

In a third experiment the corrosion inhibiting materials in the acidic solution were 0.4 wt % 4-ethyloct-1-yn-3-ol solubilised by 0.2 wt % of n-dodecyl pyridinium chloride. The corrosion rate initially rose to 0.0035 lbs/ft$^2$/hour (17.1 gm/m$^2$/hour) after which it reduced progressively during the remainder of the six hour test period, consistent with formation of film through polymerisation on the metal surface.

Example 2

An experiment was carried out observing weight loss over 3 hours in a manner similar to conventional corrosion tests. The steel used in the tests was the duplex alloy 22Cr125. Corrosion test coupons with surface area of 25-30 cm$^2$ were glass bead blasted to ensure a clean surface, measured to determine their exact surface area, weighed and then exposed to 4 molar hydrochloric acid containing corrosion inhibitor in a well stirred corrosion cell containing 200 mL fluid per test coupon. The temperature was held at 78° C.

In some of these tests the corrosion inhibitor was oct-1-yn-3-ol which is a hydrophobic acetylenic alcohol which is currently used as a corrosion inhibitor. In some others of these tests the inhibitor was a mixture containing oct-1-yn-3-ol together with $C_{13}H_{27}(OCH_2CH_2)_{10}OH$ which is a nonionic surfactant. In some of the tests the corrosion inhibitor was propyn1NMQCl which is compound XII on page 27.

The concentrations of corrosion inhibitor and the results, expressed as weight loss per unit area, are set out in the following table. The coupons were also assessed for pitting index, which is a grading according to the extent of pitting.

| Inhibitors | | | Weight loss over three hours | | |
|---|---|---|---|---|---|
| | Compound XII on page 27 | | | | |
| [Oct-1-yn-3-ol] (mmol/L) | [propyn1NMQCl] (mmol/L) | Surfactant [$C_{13}H_{27}(OCH_2CH_2)_{10}OH$] (wt %) | Weight loss (lb/ft$^2$) | Weight loss (gm/m$^2$) | Pitting index |
| 3.89 | — | — | 0.20 | 977 | 3 |
| 12.97 | — | — | 0.14 | 684 | 2 |
| — | 7.66 | — | 0.030 | 146 | 0 |
| — | 4.14 | — | 0.056 | 273 | 1 |
| 4.13 | — | 0.5 | 0.21 | 1025 | 5 |
| 8.10 | — | 0.5 | 0.19 | 928 | 5 |
| 12.02 | — | 0.5 | 0.19 | 928 | 5 |
| 19.98 | — | 0.5 | 0.14 | 683 | 4 |

-continued

| Inhibitors | | | Weight loss over three hours | | |
|---|---|---|---|---|---|
| Compound XII | | | | | |
| [Oct-1-yn-3-ol] (mmol/L) | on page 27 [propynlNMQ Cl] (mmol/L) | Surfactant [C$_{13}$H$_{27}$(OCH$_2$CH$_2$)$_{10}$OH] (wt %) | Weight loss (lb/ft$^2$) | Weight loss (gm/m$^2$) | Pitting index |
| 12.09 | 7.74 | 0.5 | 0.020 | 97.6 | 1 |
| 23.88 | 4.15 | 0.5 | 0.024 | 117 | 0 |

Oct-1-yn-3-ol has a polymerisable group but has low water solubility. The results in the table above show that even with the non-ionic surfactant present, corrosion protection was poor. Compound XII, which contained an NMQCl moiety covalently attached to a polymerisable acetylenic group gave much better corrosion protection. This was attributed to the presence of the NMQCl moity in the molecule enabling adsorption on the steel surface, after which a protective film could be formed by polymerisation. When compound XII was used together with oct-1-yn-3-ol there was further reduction in corrosion, as shown by the bottom two rows of the table.

Example 3

Four different multifunctional inhibitor compounds were tested using coupons of HS80, a low carbon steel used to fabricate coiled tubing, in the weight loss procedure used in Example 2 above. These multifunctional inhibitors were compounds mentioned above; they were:
N-propynyl quinolinium bromide (X) [propynylQBr]
N-(3-prop-1-ynyl)benzotriazine (XIV) [propargyl benzotriazole]
3-(5-hydroxyhept-6-ynyl)-1-methyl-1H-imidazol-3-ium bromide (VI) [heptynol-ImBr]
Tri(n-butyl)(3-prop-1-ynyl)ammonium bromide (XV)

A comparative test was carried out using N-propyl quinolinium bromide [propylQBr]. The results, expressed as weight loss per unit area and as pitting index are set out in the following table

| Inhibitor (mmol/L) | Multi-functional Inhibitor (mmol/L) | Cumulative weight loss after 3 hr at T = 78° C. in 4 mol/L HCl | | |
|---|---|---|---|---|
| | | (lb/ft$^2$) | (gm/m$^2$) | P.I. |
| — | PropynylQBr (11.2) | 0.0037 | 18 | 0 |
| — | PropynylQBr (2.1) | 0.0081 | 40 | 0 |
| PropylQBr (11.9) | | 0.2386 | 1165 | 2 |
| — | Propargyl benzotriazole (11.1) | 0.0095 | 46 | 0 |
| — | Heptynol-ImBr (10.7) | 0.0104 | 51 | 0 |
| — | Tributylpropynylammonium bromide (12.0) | 0.0115 | 56 | 0 |

It can be seen from the table that the multi-functional inhibitor, N-propynyl quinolinium bromide (XI) [propynylQBr], was a more effective inhibitor, at the same concentration, than propylquinolinium bromide. This indicates a strong effect due to the presence of the terminal alkyne function, —CH$_2$—C≡CH, in place of the saturated group —CH$_2$—CH$_2$—CH$_3$.

Example 4

A number of multifunctional inhibitor compounds were tested using coupons of 22Cr125 duplex alloy steel in the weight loss procedure used in Example 2 above. These multifunctional inhibitors are named in the table below and are compounds with preparations given above. Also included are the results from a comparative test using 1-octyn-3-ol. In each test the concentration of corrosion inhibitor in the hydrochloric acid was 11 millimolar.

The results of the tests are expressed in the following table as weight loss per unit area and as pitting index.

| Inhibitor (11 mM) | Cumulative weight loss after 3 hours at 78° C. in 4 mol/L HCl | | |
|---|---|---|---|
| | (lb/ft$^2$) | (gm/m$^2$) | P.I. |
| 1-Octyn-3-ol (comparative) | 0.66 | 3221 | 8 |
| 8-(Pyridin-3-yloxy)oct-1-yl-3-ol (V) | 0.26 | 1269 | 4 |
| 8-(Phenylamino)oct-1-yn-3-ol (VII) | 0.20 | 975 | 5 |
| 8-(Quinolin-6-yloxy)oct-1-yn-4-ol (IV) | 0.16 | 780 | 8 |
| N,N,N-Tributyl-6-hydroxyoct-7-yn-1-ammonium bromide (IX) | 0.11 | 537 | 5 |
| 1-(6-Hydroxyoct-7-ynyl)quinolinium bromide (II) | 0.11 | 537 | 8 |
| 1-(6-Hydroxyoct-7-ynyl)pyridinium bromide (I) | 0.070 | 342 | 4 |

As shown here, the multifunctional compounds all resisted corrosion better than the comparative compound 1-octyn-3-ol. As shown in the next example, the performance of such multifunctional compounds can be enhanced further by their usage in mixtures with polymerisable inhibitors such as acetylenic alcohols.

Example 5

Weight loss tests were carried out as in the previous example, using mixtures of the multifunctional inhibitor 1-(6-hydroxyoct-7-ynyl)quinolinium bromide (II) and 1-Octyn-3-ol. The overall concentration of corrosion inhibitor was 11 mM in each test. The results are in the following table:

| 1-(6-Hydroxyoct-7-ynyl) quinolinium bromide (II) | 1-Octyn-3-ol | Cumulative weight loss after 3 hours at 78° C. in 4 mol/L HCl | |
|---|---|---|---|
| (mol %) | (mol %) | (lb/ft$^2$) | (gm/m$^2$) |
| 100% | 0% | 0.11 | 537 |
| 60% | 40% | 0.04 | 195 |
| 80% | 20% | 0.08 | 390 |

The reduced weight loss indicates that there is synergy when the two materials are used in a mixture. This was attributed to the 1-octyn-3-ol copolymerising with the deposited multifunctional compound and improving the coverage of the metal surface because the 1-octyn-3-ol is a smaller molecule than the multifunctional compound.

Example 6

In this example, a pretreatment step is carried out before a longer period in which steel is exposed to an acidic solution.

Weight loss tests as in Example 2 above were carried out by a modified procedure. In a first stage the coupons were exposed to a composition intended to deposit a protective film on the test coupons or (as a control) to an acidic solution without inhibitor. This pretreatment stage, referred to as the film-forming stage (FFS), lasted 1 hour after which the test coupon was washed with demineralized water, allowed to dry and weighed again. The weight loss test was then carried out as in Example 2 above, using an acidic solution for 3 hours. This second stage is referred to as the film maintenance (FM) stage and the acidic solution contained a reduced concentration of corrosion inhibitor.

The experiments were carried out using coupons of the iron-chromium alloy steel 13Cr80. The film-forming pretreatment stage was carried out for 1 hour at 78° C. using 4 mol/L hydrochloric acid containing either Oct-1-yn-3-ol (11 mmol/L; FFS-1) and 0.5 wt % of the non-ionic surfactant $C_{13}H_{27}(OCH_2CH_2)_{10}OH$ or a blend of oct-1-yn-3-ol (5.5 mmol/L) and the multifunctional inhibitor molecule 8-(quinolin-6-yloxy)oct-1-yn-3-ol (IV) (5.5 mmol/L) (FFS-2) plus 0.5 wt % of the non-ionic surfactant $C_{13}H_{27}(OCH_2CH_2)_{10}OH$.

The subsequent film maintenance stage was carried out for 3 hours at 78° C. using 4 mol/L hydrochloric acid containing oct-1-yn-3-ol at a concentration of either 2 mmol/litre or 0.2 mmol/litre and also 0.5 wt % of the non-ionic surfactant $C_{13}H_{27}(OCH_2CH_2)_{10}OH$ in each case. As a control the maintenance stage was also carried out using coupons which had not received the film-forming treatment. The weight loss (WL) and pitting index (PI) results are in the following table:

|  | FFS WL after 1 hour FFS | | FM WL, P.I. after 3 hr maintenance using 2.0 mmol/L oct-1-yn-3-ol | | | FM WL, P.I. after 3 hr maintenance using 0.2 mmol/L oct-1-yn-3-ol | | |
| --- | --- | --- | --- | --- | --- | --- | --- | --- |
|  | (lb/ft²) | (gm/m²) | (lb/ft²) | (gm/m²) | P.I. | (lb/ft²) | (gm/m²) | P.I |
| No FFS (control) |  |  | 0.053 | 260 | 2 | 0.17 | 828 | 6 |
| FFS-1: 11 mmol/L Oct-1-yn-3-ol | 0.0027 | 13.1 | 0.046 | 223 | 1 | 0.17 | 766 | 5 |
| FFS-2: 5.5 mmol/L Oct-1-yn-3-ol + 5.5 mmol/L 8-(quinolin-6-yloxy) oct-1-yn-3-ol | 0.0015 | 7.3 | 0.039 | 191 | 0 | 0.11 | 561 | 4 |

It can be seen that use of the multifunctional inhibitor molecule 8-(quinolin-6-yloxy) oct-1-yn-3-ol (IV) led to reduced weight loss during the film forming stage, and better retention of the protective film during the film maintenance stage.

It will be appreciated that the embodiments and examples described in detail above can be modified and varied within the scope of the concepts which they exemplify. Features referred to above or shown in individual embodiments above may be used together in any combination as well as those which have been shown and described specifically. Accordingly, all such modifications are intended to be included within the scope of this disclosure as defined in the following claims.

The invention claimed is:

1. A method of inhibiting corrosion of metal exposed to aqueous solution comprising:
   including in the aqueous solution a first compound comprising at least one moiety (A) containing at least three carbon atoms and at least one hetero atom and at least one moiety (B) comprising at least three carbon atoms, wherein:
   the at least one hetero atom comprises nitrogen, oxygen, phosphorus or sulphur,
   the at least one moiety (B) contains one or more polymerisable groups containing one of the structures

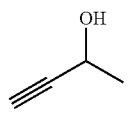

or —C≡N or

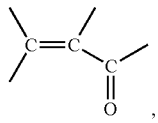

and
the moieties (A) and (B) are directly or indirectly covalently connected together.

2. The method according to claim 1, wherein the at least one moiety (A) comprises an aliphatic, aromatic or mixed aliphatic/aromatic structure containing one or more hetero atoms which are nitrogen, oxygen, phosphorus or sulphur.

3. The method according to claim 1, wherein the at least one moiety (A) contains at least one hetero atom which is nitrogen.

4. The method according to claim 1, wherein the at least one moiety (A) comprises at least one aromatic ring with a hetero atom in the ring or directly attached to the ring.

5. The method according to claim 1, wherein the at least one moiety (A) comprises at least one aliphatic carbon atom with a hetero atom attached thereto.

6. The method according to claim 1 wherein the first compound comprises two or three of the at least one moiety (B).

7. The method according to claim 6 wherein the two or three of the at least one moiety (B) are identical to each other.

8. The method according to claim 1, wherein the first compound conforms to a formula A(m)-Y(p)-B(n) wherein Y denotes a linking group containing at least three carbon atoms and m, n and p each independently denote a value in a range from 1 to 10.

9. The method according to claim 8 wherein Y is a saturated aliphatic carbon chain of from 4 to 7 carbon atoms.

10. The method according to claim 1 wherein the solution is acidic.

11. The method according to claim 1 wherein the metal is steel.

12. The method according to claim 1 wherein the metal is duplex alloy steel.

13. The method according to claim 1, further comprising including in the aqueous solution a second compound comprising one or more polymerisable groups containing double or triple bonded carbon.

14. The method according to claim 13, wherein the second compound has a molecular weight smaller than that of the first compound.

* * * * *